United States Patent Office 2,886,513
Patented May 12, 1959

2,886,513
TITANIUM DIOXIDE-CALCIUM OXIDE CATALYST FOR CRACKING HYDROCARBONS

Edward G. Baker, Summit, N.J., assignor to Esso Research and Engineering Company, a corporation of Delaware No Drawing. Application October 5, 1954
Serial No. 460,497

11 Claims. (Cl. 208—121)

This invention relates to improvements in catalysts or contacting agents for the conversion of hydrocarbons, or more particularly, the cracking of hydrocarbons and to methods of converting or cracking hydrocarbons using such catalysts or contacting agents.

The catalytic cracking of relatively high boiling hydrocarbons such as gas oils is well known commercially and several processes are used commercially to produce high octane gasoline. As catalysts, acid treated natural clays containing silica and alumina and synthetically prepared catalysts containing silica and alumina are widely used. In addition, silica magnesia catalysts and combinations of silica-alumina with magnesia or zirconia are known but used less extensively than those comprising only silica and alumina. While the known catalysts give fairly good results in hydrocarbon conversion processes there is a definite need for catalysts of improved properties and greater efficiency, and extensive research work is currently being directed toward this end.

According to the present invention a non-siliceous catalyst or contacting agent has been developed which contains calcium oxide and titanium dioxide in certain proportions and may be referred to as a calcium titanate catalyst. In cracking operations it has been found that a higher yield of gasoline is produced with this novel catalyst than with commercial silica-alumina catalyst, and in addition the gasoline produced is more olefinic than that obtained with commercial silica-alumina catalyst. The synthetic calcium oxide-titanium dioxide catalyst of this invention contains from about 20 to 60% by weight of calcium oxide, preferably between about 35 and 45% by weight, with the remainder being substantially all titanium dioxide.

Another advantage of the catalyst made in accordance with this invention is its excellent stability when heated at calcining temperatures. This result was entirely unexpected since other synthetic catalysts containing a major proportion of titanium dioxide in combination with such oxides as alumina or zirconia have been shown to be especially prone to sintering at calcining temperatures of 1000–1200° F., resulting in a reduction in surface area to as low as 100 sq. m./g. following such treatment. The calcium-oxide titanium dioxide catalyst, however, after calcining retained a surface area almost double that of the aforementioned catalysts, which is indicative of a high degree of stability and long catalyst life.

It has been found that the calcium oxide-titanium dioxide catalyst of the present invention can be further improved by the addition of minor amounts of other metal oxides or compounds and such improved catalyst may also be utilized advantageously in other hydrocarbon conversion operations. Also the new catalyst made according to the present invention may be used in the formulation of still other combinations having value as catalysts.

The synthetic calcium oxide-titanium dioxide composition may be prepared by several methods according to this invention. One method of preparing the new catalyst, which is the preferred method, comprises impregnating hydrous titanium dioxide with an aqueous solution of calcium nitrate, filtering, drying the recovered solids, and then calcining to decompose the calcium nitrate in situ. The hydrous oxide of titanium dioxide may be prepared by precipitation from an aqueous acid solution of a soluble titanium salt such as the sulfate or chloride using ammonium hydroxide or other volatile base such as short-chain quaternary ammonium hydroxides.

A calcium oxide-titanium dioxide catalyst of high stability also may be prepared by co-precipitating calcium titanate from an acid solution of the salt by the addition of fixed or volatile bases. Calcium chloride and titanyl chloride in hydrochloric acid or calcium nitrate and titanyl nitrate in nitric acid also may be used in preparing the calcium oxide-titanium dioxide catalyst of this invention.

In still another preparation the hydrous oxide or hydrogel of titanium dioxide may be mulled slowly with uncalcined slaked lime and heated to about 900°–1200° F. for a period of 4 to 8 hours.

In another method the hydrous oxide or hydrogel of titanium dioxide may be used to hydrolyze calcium alcoholate (such as methoxide or ethoxide), or calcium phenolate or cresylate, with subsequent heating at about 225°–275° F. for about 16 hours to effect an intimate combination of the two metal oxide components.

A catalyst was prepared according to this invention by the following method.

EXAMPLE 1

Hydrous titanium dioxide was prepared by dissolving 600 g. of $Ti(SO_4)_2$ cake containing about 20% $TiO_2$, 50% $H_2SO_4$ and 30% $H_2O$ in 600 cc. of water. Then about 4.5 liters of 1.2 normal ammonium hydroxide solution were added slowly with constant stirring until the pH of the solution was about 5 to precipitate hydrous titanium dioxide. The precipitated hydrous titanium dioxide was filtered, reslurried 3 times with ammoniated water (pH about 8), and then air dried on a filter press. The air dried hydrous oxide contained about 13.5% by weight of $TiO_2$ and about 86.5% by weight of water.

Then about 865 g. of the hydrous titanium dioxide prepared as just described was mixed with about 350 g. of calcium nitrate $(Ca(NO_3)_2 \cdot 4H_2O)$ dissolved in about 300 cc. of water and mixed in a Waring Blendor to make a homogeneous slurry.

The resulting mixture was drained on a Buechner funnel and the filtered solids were then dried at about 400° F. for 16 hours, followed by calcining for about 5 hours at 1000° F. to decompose the calcium nitrate to calcium oxide in situ. The resulting catalyst was formed into pills of a size of about 3/16" by 3/16". The catalyst contained about 41% by weight of calcium oxide and 59% by weight of titanium dioxide and had a surface area of about 194 sq. m./g.

The catalyst of this invention was then compared with fresh commercial silica-alumina synthetic catalyst containing about 13% alumina. Each of these catalysts was used to crack an East Texas light gas oil of the following characteristics:

° API 60/60=33.7
Boiling range=490° to 700° F.

The cracking was carried out in a 200 cc. fixed bed reactor at atmospheric pressure. The comparative results obtained with these two catalysts are shown in Table 1.

Table 1

| Catalyst | 41% CaO—59% TiO$_2$ | Fresh Synthetic SiO$_2$—Al$_2$O$_3$ |
|---|---|---|
| Temp., °F | 975 | 950 |
| Feed Rate, W./Hr./W.[1] | 0.70 | 2.40 |
| Cycle Length, hrs | 2 | 1 |
| 430° F. Conversion, wt. percent | 40 | 40 |
| Yields, wt. percent on feed: | | |
| C$_5$—430 gasoline | 24.4 | 23.0 |
| Carbon | 5.0 | 2.8 |
| Dry gas | 7.6 | 6.0 |
| C$_4$ gaseous hydrocarbons | 3.0 | 7.5 |
| C$_5$+Gasoline: | | |
| Br$_2$ No., cg./ml | 81 | 40 |
| Aniline Pt., °F | 67 | 65 |
| API° Gravity | 55 | 59 |

[1] Weight of gas oil per hour per unit weight of catalyst.

From the data in Table 1 it will be seen that a non-siliceous cracking catalyst has been produced which gives a higher yield of C$_5$—430° F. gasoline than commercial synthetically prepared silica-alumina cracking catalyst.

Moreover the higher yield of gasoline produced with the calcium oxide-titanium dioxide catalyst is considerably more olefinic as indicated by the bromine number, than that obtained with the synthetic silica-alumina catalyst, whereas the aromaticity, as measured by aniline point inspections, is about the same in either case.

Thus the gasoline produced by cracking with the calcium oxide-titanium dioxide catalyst of this invention will give better over-all performance than the gasoline of a lower olefin content as produced by cracking with a commercial silica-alumina catalyst.

Further analysis of the products formed showed that even at a conversion level as low as 40% as given in Table 1, the C$_4$-C$_5$ gases contained nearly 90% by weight of unsaturates. These highly olefinic fractions can be converted with little or no purificaiton into a variety of chemicals, fuels, lubricants and other useful products. Less than one-half the amount of C$_4$ hydrocarbons were produced with the new catalyst as compared to the commercial silica-alumina catalyst.

Operation at higher temperatures between about 1000° and 1030° F. improves the activity of the catalyst and results in gasoline of increased volatility. Moreover, at a higher temperature than that given in Table 1, degradation to carbon is materially reduced.

The synthetic CaO·TiO$_2$ of the present invention contains from about 20 to 60% CaO, preferably between 35 and 45%, with the rest the oxide of titanium.

The activity and selectivity of the calcium oxide titanium dioxide catalyst made according to this invention may be improved by the addition of about 0.5 to 1.5% by weight of beryllium oxide, cerium oxide or zirconium dioxide as the hydrous oxide, during the wet stage of manufacture of the calcium oxide-titanium dioxide catalyst.

A catalyst for hydrocracking and desulfurizing hydrocarbons may be produced by adding 5 to 20% by weight of molybdena to the new calcium oxide-titanium dioxide catalyst.

EXAMPLE 2

A method of preparing reforming catalysts containing nickel oxide supported on the aforementioned calcium oxide-titanium dioxide catalyst is described below. Such a catalyst has exceptional dehydro-isomerization activity and good activity for upgrading virgin naphthas.

As the calcium oxide-titanium dioxide base, titanium hydrogel was mulled with an equimolar amount of calcium hydroxide. After drying and calcining at 1200° F., the base was impregnated with a solution of nickel nitrate so that the final calcined catalyst contained about 5% by weight nickel oxide (NiO). Following impregnation, the catalyst was calcined at about 1000° F. for about 5 hours to form the nickel oxide.

In the preparation of this catalyst the nickel oxide may be varied between about 1 and 30% by weight.

The catalyst prepared as above and comprising a CaO·TiO$_2$ base impregnated with 5% NiO was compared with a commercial 90% Al$_2$O$_3$·10% MoO$_3$ for dehydrogenating C$_5$ ring naphthenes at 200 p.s.i.g. and 2/1 H$_2$ to hydrocarbon dilution at a temperature of 975° F. to produce aromatic hydrocarbons containing benzene.

Table 2

| Catalyst, wt. percent | 95 CaO.TiO$_2$.5 NiO | 90 Al$_2$O$_3$.10 MoO$_3$ |
|---|---|---|
| Percent Aromatics from methylcyclopentane feed | 28 | 17 |

The above data show that more aromatic hydrocarbons are produced from a C$_5$ ring naphthene feed than are produced from conventional reforming catalyst.

The catalyst made according to this inveniton may be ground to form finely divided catalyst of optimum particle size for the well known fluid catalytic cracking process or it may be pilled for use in fixed bed or moving bed hydrocarbon conversion processes. The catalyst may also be used as a hydrogen transfer catalyst in reactions involving hydrocarbons.

In Example 1 the amount and concentration of the ammonium hydroxide may be varied; that is, for the concentration of ammonium hydroxide given in Example 1 the volume may vary between about 4.0 and 5.0 liters; and for the same volume of 4.5 liters given in Example 1, the normality of the ammonium hydroxide solution may vary between about 1.0 and 1.5. The amount of washing applied to the hydrous titanium dioxide may be varied and is not limited to 3 times given in Example 1. Ammonium nitrate may be added to the rewash solution if peptization of the TiO$_2$ gel occurs during washing. The amount of solids in the air dried hydrous titanium dioxide may vary between about 10 and 20% by weight of TiO$_2$ with the remainder being water.

The concentration of the calcium nitrate may be varied and the amount used for admixture with the hydrous titanium dioxide in such a way that using the same amount of water solution, namely 300 cc. given in Example 1, the amount of calcium nitrate may vary between about 120 and 740 g., or using the same amount of calcium nitrate given in Example 1, the amount of water used for dissolving the nitrate may vary between about 200 and 400 cc.

The filtered solids in Example 1 may be dried at a temperature of about 250° to 400° F. and the time of drying may vary between 8 and 16 hours. The calcination temperature may vary between about 1000° and 1200° F. and the time of calcination may vary between about 3 and 6 hours. Instead of drying to decompose the calcium nitrate, a base such as ammonium hydroxide or sodium hydroxide may be used to form calcium hydroxide.

In catalytic cracking of hydrocarbons, the temperature of cracking may be between about 900° and 1030° F. and the w./hr./w. may be between about 0.5 and 15. The catalyst is regenerated by heating at a temperature of between about 1000° to 1200° F. for a length of time sufficient to burn off carbonaceous deposits and restore its activity.

Catalysts made according to the present invention produce more olefinic products than conventional cracking catalysts and such products may be used to make new products. The cracked products may be separated into desired fractions by distillation. For example, the C$_4$ or C$_5$ or C$_7$ fractions or the 100–250° F. or the 250–350° F. liquid fractions may be separated and treated without isolating the olefins from other components. The olefinic products may be polymerized to superior lubricating oils, hydrated to alcohols and ethers or subjected to oxonation to aldehydes and then converted to alcohols. The oxonated product may be condensed and dehydrated and then reacted with dienes, phthalic anhydride, maleic anhydride etc. The olefinic products may be chlorinated, dehydrochlorinated, oxidized with oxygen or reacted with diolefins separated from steam cracked products or they may be sulfonated to form detergents (alcohols or olefins). The chlorinated and dehydrochlorinated products may be reacted with dienes, phthalic anhydride, maleic anhydride etc. The lighter $C_4$ and $C_5$ fractions may be dehydrogenated to diolefins.

The products resulting from treating the olefinic products are useful as solvents and in making drying oils, resins, plastics, elastomers and similar products.

For some processes such as oxonation a low sulfur hydrocarbon feed is required. The olefins produced from cracking hydrocarbons with the catalyst of the present invention are lower in sulfur than those obtained with conventional silica-alumina cracking catalyst and may be further freed of sulfur by mild hydroforming.

The olefinic gasoline fraction may be reformed, hydroformed or aromatized.

What is claimed is:

1. A method of preparing a catalytic or contact material containing calcium oxide and titanium dioxide which comprises mixing hydrous titanium dioxide with a water solution of a soluble calcium compound and then drying the resulting mixture and then calcining the dried mixture at a temperature between about 1000° F. and 1200° F. for about 3 to 6 hours to form the oxide from the calcium compound.

2. A catalyst for catalytic cracking of hydrocarbons consisting essentially of a major proportion of titanium dioxide and a minor proportion of calcium oxide and having been calcined at a temperature between about 1000° F. and 1200° F. for about 3 to 6 hours.

3. A method of preparing a catalyst containing titanium dioxide and calcium oxide which comprises dissolving a titanium compound in water, then adding an alkaline precipitant to precipitate hydrous titanium dioxide, filtering and drying the precipitate, then mixing a water solution of a calcium salt with the hydrous precipitate to form a homogeneous slurry and to impregnate the precipitate with the calcium salt, filtering out the impregnated precipitate and then drying the precipitate and then calcining the dried precipitate at a temperature between about 1000° F. and 1200° F. for about 3 to 6 hours to decompose the calcium salt to calcium oxide.

4. A calcium oxide-titanium dioxide catalyst containing about 41% by weight of calcium oxide and 59% by weight of titanium dioxide and having been calcined about 1000° F. and 1200° F. for about 3 to 6 hours.

5. A catalyst having a relatively large surface area containing a major proportion of calcium oxide and titanium dioxide and a minor proportion of nickel oxide and having been calcined at a temperature between about 1000° F. and 1200° F. for about 3 to 6 hours.

6. A catalyst or contacting agent having a relatively large surface area comprising about 95% of $CaO \cdot TiO_2$ and about 5% of NiO and having been calcined at a temperature between about 1000° F. and 1200° F. for about 3 to 6 hours.

7. A process for aromatizing a $C_5$ ring naphthene which comprises contacting a feed containing a $C_5$ ring naphthene with a catalyst consisting essentially of about 95% of $CaO \cdot TiO_2$ and about 5% of NiO and in the presence of added hydrogen and at a superatmospheric pressure and at a temperature of at least about 975° F., said catalyst having been calcined at a temperature between about 1000° F. and 1200° F. for about 3 to 6 hours.

8. A catalyst containing a major proportion of $CaO \cdot TiO_2$ and 0.5 to 1.5% of a promoter selected from the group consisting of beryllium oxide, cerium oxide and zirconium oxide, said catalyst having been calcined at a temperature between about 1000° F. and 1200° F. for about 3 to 6 hours.

9. A method of catalytically cracking higher boiling hydrocarbons to produce olefinic gasoline which comprises contacting higher boiling hydrocarbons in a cracking zone at a temperature between about 900° F. and 975° F. with a catalyst prepared by forming a hydrous titanium dioxide, drying the hydrous titanium dioxide, then mixing an aqueous solution of a calcium salt with the dried titanium dioxide to form a homogeneous slurry and to impregnate the titanium dioxide with the calcium salt, filtering the resulting slurry, drying the recovered solids and then calcining the dried solids at a temperature between about 1000° F. and 1200° F. for about 3 to 6 hours to form the catalyst.

10. A method as defined in claim 9 wherein said catalyst contains a major proportion of titanium dioxide.

11. A method of catalytic conversion of higher boiling hydrocarbons to produce olefinic gasoline which comprises contacting higher boiling hydrocarbon oils at a temperature of about 900°–975° F. with a catalyst consisting essentially of a major proportion of titanium dioxide and a minor proportion of calcium oxide, said catalyst having been calcined at a temperature between about 1000° to 1200° F. for about 3 to 6 hours.

References Cited in the file of this patent

UNITED STATES PATENTS

| | | |
|---|---|---|
| 1,732,381 | Schmidt et al. | Oct. 22, 1929 |
| 2,140,236 | Lederle | Dec. 13, 1938 |
| 2,166,221 | Patterson | July 18, 1939 |
| 2,319,948 | Pitzer | May 25, 1943 |
| 2,365,895 | Mavity | Dec. 26, 1944 |
| 2,627,506 | Hunter et al. | Feb. 3, 1953 |
| 2,684,951 | Mottern | July 27, 1954 |

FOREIGN PATENTS

| | | |
|---|---|---|
| 384,473 | Great Britain | Dec. 8, 1932 |
| 583,494 | Great Britain | Dec. 19, 1946 |